US007854401B2

(12) United States Patent
Malek

(10) Patent No.: US 7,854,401 B2
(45) Date of Patent: Dec. 21, 2010

(54) FAUCET WAND

(75) Inventor: Michael L. Malek, North Olmsted, OH (US)

(73) Assignee: Moen Incorporated, North Olmsted, OH (US)

( * ) Notice: Subject to any disclaimer, the term of this patent is extended or adjusted under 35 U.S.C. 154(b) by 869 days.

(21) Appl. No.: 11/638,840

(22) Filed: Dec. 14, 2006

(65) Prior Publication Data

US 2007/0193640 A1 Aug. 23, 2007

Related U.S. Application Data

(60) Provisional application No. 60/750,610, filed on Dec. 14, 2005.

(51) Int. Cl.
*B05B 1/00* (2006.01)
*A62C 31/00* (2006.01)
*F15B 13/00* (2006.01)
*F16K 21/00* (2006.01)

(52) U.S. Cl. ....................... 239/600; 239/444; 239/443; 239/445; 239/447; 137/801

(58) Field of Classification Search ................. 137/801; 239/443, 444, 445, 447, 449
See application file for complete search history.

(56) References Cited

U.S. PATENT DOCUMENTS

| | | | | |
|---|---|---|---|---|
| 215,947 | A | 5/1879 | McMackin | |
| 222,935 | A | 12/1879 | Moulton | |
| 702,125 | A | 6/1902 | Buckley | |
| 1,028,579 | A | 6/1912 | Lutz | |
| 3,262,466 | A | 7/1966 | Adams et al. | |
| 3,366,143 | A | 1/1968 | Bauer | |
| 3,513,868 | A | 5/1970 | Halbach et al. | |
| 3,854,665 | A | 12/1974 | Rodgers | |
| 4,811,760 | A | 3/1989 | Van Kirk et al. | |
| 5,937,905 | A * | 8/1999 | Santos | 137/871 |
| 6,347,645 | B2 | 2/2002 | Gurubatham et al. | |
| 6,503,391 | B2 | 1/2003 | Desjoyaux et al. | |
| 6,641,057 | B2 * | 11/2003 | Thomas et al. | 239/104 |
| 6,837,260 | B1 | 1/2005 | Kuehn | |
| 6,935,375 | B2 * | 8/2005 | Blessing | 137/637 |
| 7,070,125 | B2 * | 7/2006 | Williams et al. | 239/443 |
| 7,520,448 | B2 * | 4/2009 | Luettgen et al. | 239/463 |
| 2003/0121993 | A1 * | 7/2003 | Haverstraw et al. | 239/443 |

* cited by examiner

*Primary Examiner*—Len Tran
*Assistant Examiner*—Justin Jonaitis
(74) *Attorney, Agent, or Firm*—Calfee, Halter & Griswold LLP

(57) ABSTRACT

A faucet wand includes a waterway having a body with a cavity therein. A plate is attached to the body to cover the cavity and form a conduit in the waterway.

22 Claims, 12 Drawing Sheets

FAUCET WAND

RELATED APPLICATION

This application claims the benefit of U.S. provisional application Ser. No. 60/750,610 filed on Dec. 14, 2005, which is hereby incorporated by reference.

TECHNICAL FIELD

The present invention generally relates to a pull-out wand used in association with a faucet. More particularly, the present invention relates to a faucet wand incorporating a unitarily formed waterway body, and at least one water-diverting valve provided therein to control the flow of water through the wand. More specifically, the present invention relates to a faucet wand having fluid conduits formed through a waterway body by initially forming cavities and/or chambers in the side of the waterway body, and, thereafter, attaching side plates to the waterway body to cover the cavities and/or chambers, and relates to a faucet wand having a valving configuration using at least one water-diverting valve that can be returned to its original position by discontinuing the flow of water through the faucet wand.

BACKGROUND

It is often desirable to provide multi-function faucet wands (also called sprayheads or pull-out sprays) with more than one water delivery mode. Multiple delivery modes may include a stream mode and a spray mode. In the stream mode, water is discharged from the faucet wand in a single, relatively large stream. In the large number of relatively small streams. Multiple delivery modes of this type are particularly useful in kitchen faucets, although their use is not limited to kitchens. Lavatory faucets, shower faucets, or any other faucets, including a garden hose, may benefit from this feature.

A difficulty that arises during the manufacture of multi-function faucet wands concerns their waterways. Previously, the waterways of multi-function faucet wands have been formed through the interconnection of various segments such as tubes and valving sub-assemblies. For example, the various tubes and valving sub-assembles have been mechanically or adhesively fastened together to provide the fluid conduits and valves through which water flows in such multi-function faucet wands. However, to increase the functionality of such faucet wands, relatively large numbers of tubes and valving sub-assemblies must be mechanically or adhesively fastened together. The assembly of relatively large numbers of tubes and valving sub-assemblies makes the resulting waterways prohibitively expensive. As such, there is a need for a waterway which can be formed to afford the formation of various fluid conduits and valving areas to accept valves without the need to mechanically or adhesively fasten together various tubes and valving sub-assemblies. Such a waterway could provide for increased functionality by allowing the utilization of valving configurations afforded by the provision of relatively large numbers of fluid conduits.

SUMMARY

It an exemplary aspect to provide a faucet wand including a waterway having a body with a cavity provided therein, wherein a plate attached to the body covers the cavity to form a conduit in the waterway.

It is another exemplary aspect to provide a faucet wand including a waterway having a body with an inlet region, an outlet region and an intermediate region, with a cavity provided in the intermediate region, wherein a plate attached to the body covers the cavity to form a conduit in the waterway.

It is yet another exemplary aspect to provide a faucet wand including a waterway having a body with a cavity and a valve chamber provided therein, wherein a plate attached to the body covers the cavity and the valve chamber to form a conduit in the waterway.

It is still another exemplary aspect to provide a method of forming a faucet wand, including the steps of forming a body with a cavity provided therein, forming a plate and permanently attaching the plate to the body so that the plate covers the cavity to form a conduit in a waterway of the faucet wand.

DETAILED DESCRIPTION

Figure 1:
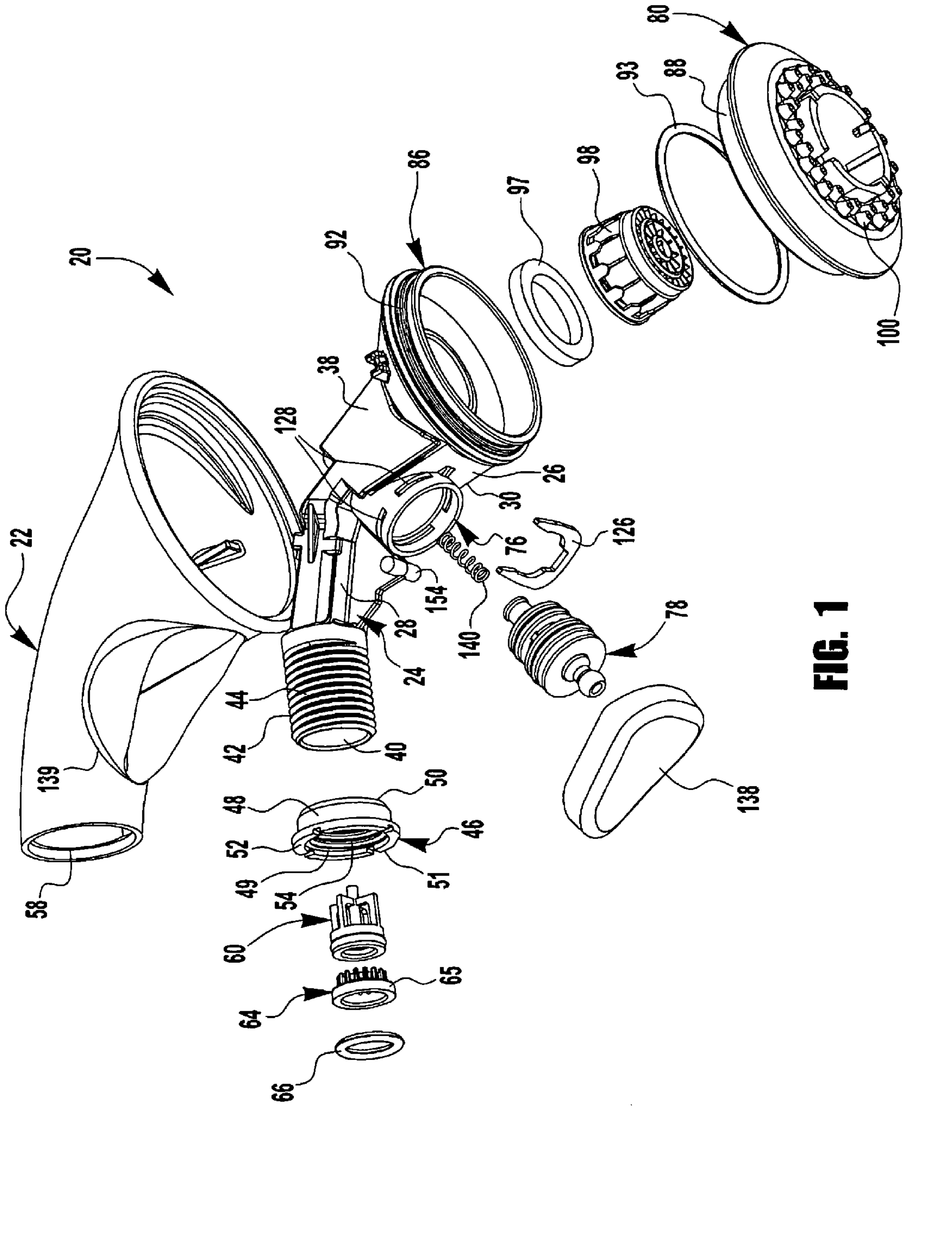
FIG. 1 is an assembly view of one embodiment of a faucet wand according to the present invention.
Figure 3:
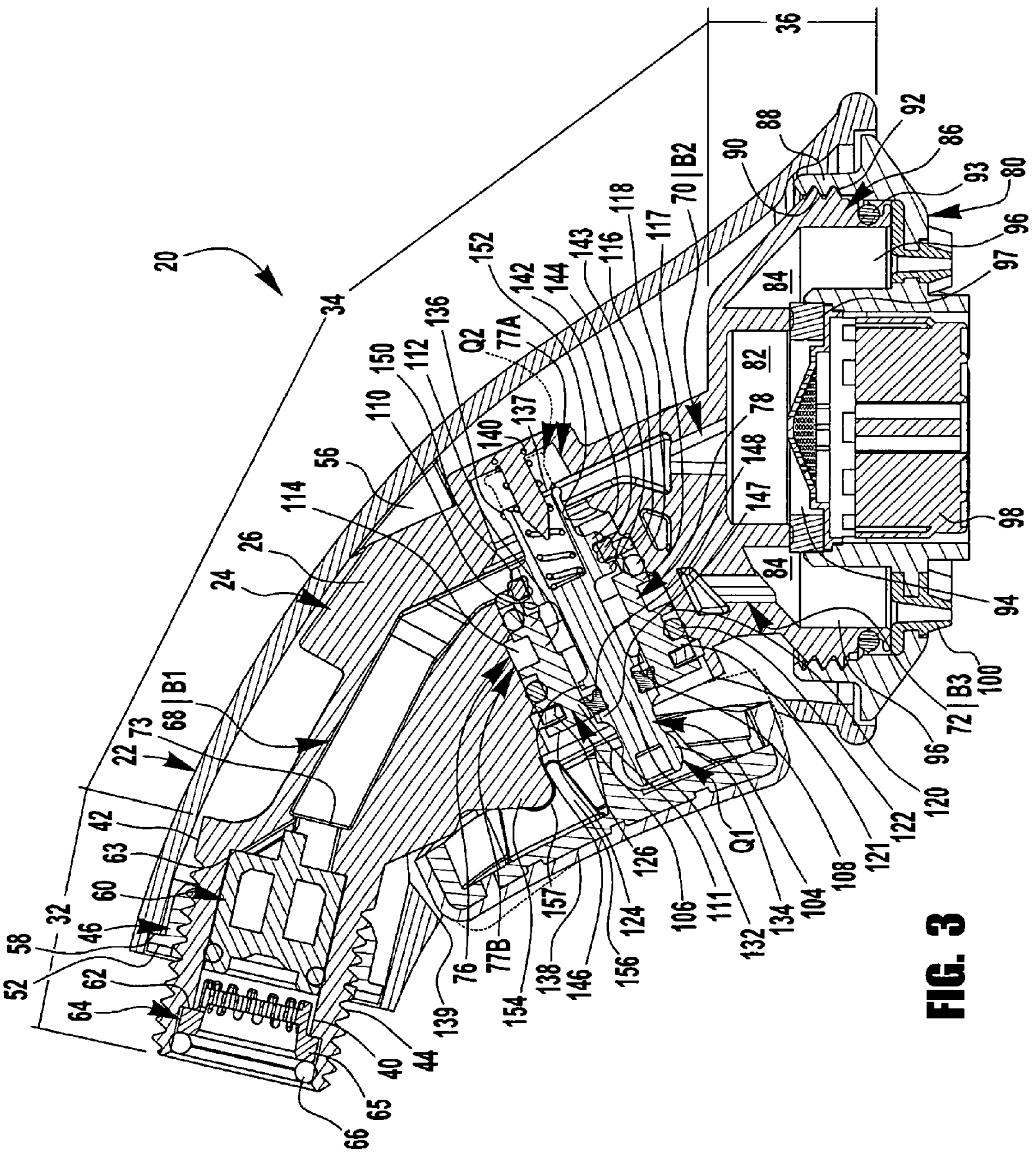
FIG. 3 is a cross-sectional view of the assembled faucet wand depicted in FIG. 1.

One embodiment of a faucet wand of the present invention is generally indicated by the numeral 20 in FIGS. 1 and 3. The wand 20 includes a shell 22 and a waterway 24 enclosed in the shell 22. The waterway 24 includes a body 26 that can be unitarily formed through any variety of molding processes. As discussed below, the body 26 can include various cavities and/or chambers formed therein.

The body 26 of the waterway 24 has a first side 28 and a second side 30. Furthermore, for the sake of this description, the body 26 is segregated into various regions. For example, the body 26 can include an inlet region 32, an intermediate region 34, and a head region (or an outlet region) 36. The various regions can have various cavities and/or chambers selectively formed in sides of the body 26.

As discussed below, the attachment of a side plate 38 affords the formation of fluid conduits in the body 26. The side plate 38 can be adhesively or mechanically attached or otherwise affixed to the body 26 to afford the formation of various conduits through the waterway 24. For example, adhesives can be provided on the body 26 and/or side plate 38 to facilitate attachment of the side plate 38 to the body 26. Furthermore, mechanical fasteners can be used to attach the side plate 38 to the body 26. Such mechanical fasteners could be provided through the side plate 38 into body 26, and may require seals (such as gaskets or membranes) between the body 26 and side plate 38 to prohibit leakage.

Figure 2:
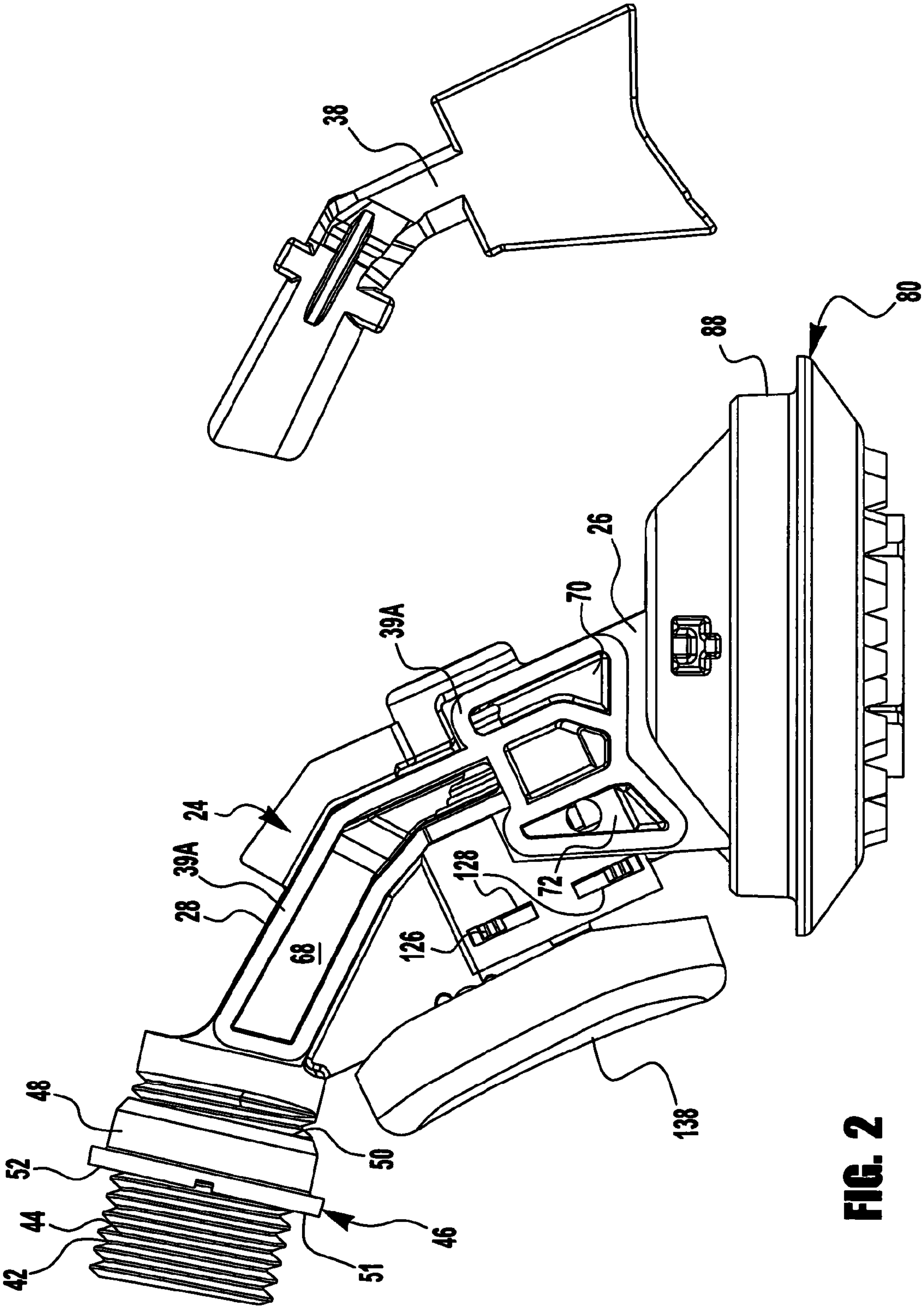
FIG. 2 is a side elevational view of one side of the waterway and one side of the plate ultimately attached to the one side of the waterway as depicted in FIG. 1.
Figure 2A:
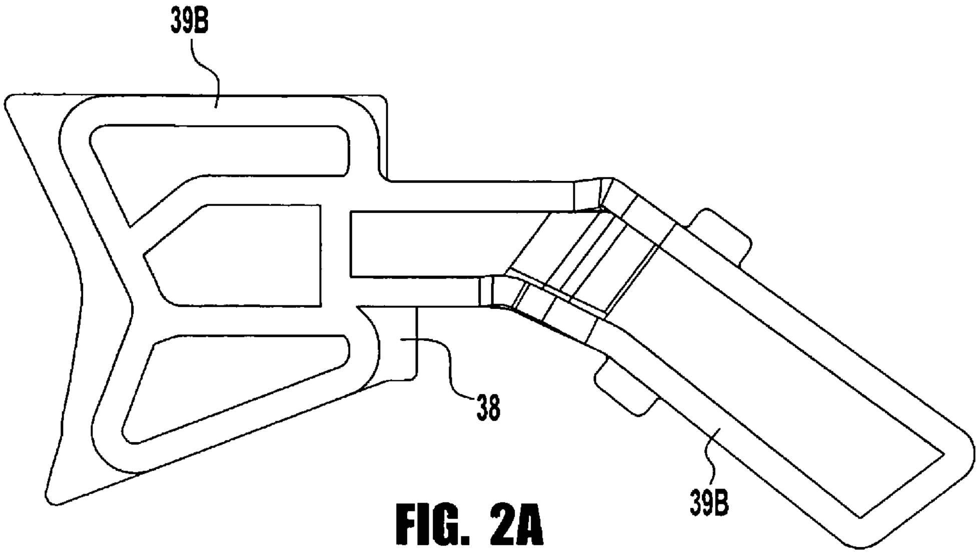
FIG. 2A is a side elevational view of the other side of the plate depicted in FIG. 2.

For example, if the body 26 and side plate 38 are formed from polymeric material, the side plate 38 can be welded to the body 26 using weld beads 39A (FIG. 2) and 39B (FIG. 2A) formed on the body 26 and side plate 38, respectively. As depicted in FIG. 2, the weld beads 39A can trace the perimeter of the cavities and/or chambers formed in the body 26. To attach the side plate 38 to the body 26, the polymeric material forming the weld beads 39A and 39B is initially melted using a hot plate (not shown). Thereafter, the side plate 38 is attached to the body 26 to cover the cavities and/or chambers formed therein. Once the melted polymeric material from the weld beads 39A and 39B intermingles and cures, the side plate 38 is permanently attached to the body 26.

The inlet region 32 includes an inlet passage 40 extending therethrough. The inlet region 32 also includes an exterior surface 42 having threads 44 formed thereon. The threads 44 can be used in attaching the wand 20 to a water hose (not shown). The threads 44 can also be used to receive an attachment collar 46. The attachment collar 46 can be used to attach the shell 22 to the waterway 24. As shown in FIGS. 1 and 3, the attachment collar 46 includes an exterior surface 48 and an interior surface 49 extending between a first end 50 and a second end 51. A flange 52 can be provided on the attachment collar 46 adjacent the second end 51, and threads 54 can be provided on the interior surface 49. After the waterway 24 has been provided in the shell 22, the attachment collar 46 can be received around the inlet region 32 to aid in attaching the shell 22 and waterway 24 together.

When the attachment collar 46 is received around the inlet region 32, the shell 22 can be clamped between the body 26 and attachment collar 46. For example, as the threads 44 and 54 threadedly engage one another, the inlet region 32 is drawn through the interior of the attachment collar 46. Further threaded engagement of the threads 44 and 54 forces the body 26 to engage a protrusion 56 formed on the interior of the shell 22, and forces the flange 52 (of the attachment collar 46) to engage a shoulder 58 also formed on the interior of the shell 22. Engagement of the body 26 with the protrusion 56 and of the flange 52 with the shoulder 58 effectively clamps the shell 22 between the body 26 and attachment collar 46. As such, use of the attachment collar 46 aids in securing the attachment of the shell 22 to the waterway 24. If necessary, mechanical fasteners (not shown) can also be used to further secure the attachment of the shell 22 and waterway 24.

A check valve 60 can be provided in the inlet passage 40 to allow forward flow and prohibit backward flow of water through the wand 20. For example, the inlet passage 40 includes a first shoulder 62 and a second shoulder 63. A screen 64 can be provided adjacent the check valve 60 to catch particulate in the water before its flows through the wand 20. The screen 64 includes a flange 65 which interfaces with the first shoulder 62. The check valve 60 is positioned between the second shoulder 63 and screen 64, and is moveable between positions allowing forward flow and positions prohibiting backward flow of water through the inlet passage 40. If necessary, an o-ring 66 can be provided in the inlet passage 40 to seal against the water hose supplying water to the wand 20.

As shown in FIG. 2, cavities 68, 70, and 72 are formed in the intermediate region 34 on the first side 28. When the side plate 38 is attached to the first side 28, the cavities 68, 70, and 72 are enclosed to become fluid conduits B1, B2, and B3. As discussed above, the side plate 38 can be welded to the body 26 or otherwise permanently affixed to the body 26.

The fluid conduits B1, B2, and B3 facilitate flow of water through the intermediate region 34. Because the cavities and/or chambers forming the fluid conduits B1, B2, and B3 are formed in the side 28, and the sizes and shapes thereof are only limited by the molding process, restrictions can be provided in the various conduits to aid in controlling the flow of water through the wand 20. For example, a restriction 73 can be provided in the cavity 68 to aid the control of water flowing through the conduit B1.

The conduit B1 and conduit B2, and the conduit B1 and conduit B3 are interconnected by a water-diverting valve chamber 76 formed in the intermediate region 34. The water-diverting valve chamber 76 can be generally cylindrical having a first section 77A and a second section 77B. The water-diverting valve chamber 76 is configured to receive a water-diverting valve 78. The water-diverting valve 78 can include components that can be actuated between two positions, an outward position Q1 and an inward position Q2, to divert water to one of two conduits. For example, in the outward position Q1, the water-diverting valve 78 diverts water from the conduit B1 to the conduit B2, and, in the inward position Q2, the water-diverting valve 78 diverts water from the conduit B1 to the conduit B3.

The diversion of water afforded by the actuation of the water-diverting valve 78 serves to direct water to various output chambers in the head region 36, and through, as discussed below, corresponding output patterns in a spray face 80. The head region 36 includes a first chamber 82 and a second chamber 84. The first chamber 82 can have a circular shape, and the second chamber 84 can be an annular ring shape surrounding the first chamber 82. As shown in FIG. 3, the first chamber 82 communicates with the conduit B2 and the second chamber 84 communicates with the conduit B3.

The spray face 80 is attached to the body 26 around a perimeter 86 of the head region 36. The spray face 80 includes a rim 88 and threads 90 formed around the interior of the rim 88. When the spray face 80 is attached to the head region 36, the threads 90 engage threads 92 formed around the perimeter 86. An o-ring 93 can be provided around the perimeter 86 to sealingly engage the rim 88, thereby prohibiting water from leaking between the body 26 and spray face 80.

The spray face 80 includes an interior cavity having a first chamber 94 and a second chamber 96. When the spray face 80 is attached to the body 26, the first chamber 94 communicates with the first chamber 82, and the second chamber 96 communicates with the second chamber 84. A seal ring 97 is provided between the head region 36 and spray face 80 to prohibit water from leaking from the first chamber 82 and first chamber 94 to the second chamber 84 and second chamber 96. The first and second chambers 94 and 96 correspond to two (2) output patterns provided in the spray face 80. For example, the first chamber 94 is provided with an aerator 98 and the second chamber 96 communicates through the spray face 80 via a spray pattern 100. As such, water flowing through the first chamber 82 (from conduit B2) into the first chamber 94 exits the wand 20 through the aerator 98 as a stream. Furthermore, water flowing through the second chamber 84 (from conduit B3) into the second chamber 96 exits the wand 20 through the spray pattern 100 as a spray. Consequently, depending on the position of the water-diverting valve 78, water exits the wand 20 as a stream through the aerator 98, or as a spray through the spray pattern 100.

As shown in FIGS. 1 and 3, the water-diverting valve 78 can be a pressure-biased valve including a spool 104 and a spool guide 106. The spool guide 106 of the water-diverting valve 78 is received within the second section 77B of the water-diverting valve chamber 76. The spool guide 106 includes a spool-receiving aperture 108 that can be generally cylindrical. The spool-receiving aperture 108 defines the path of reciprocal movement of the spool 104 between the outward position Q1 and inward position Q2.

The spool guide 106 includes a first portion 110 and a second portion 111 joined by two (2) connecting legs 112. The connecting legs 112 define passageways (not shown) therebetween allowing the passage of water through the spool-receiving aperture 108 to an annular channel 114 formed around the spool guide 106 between the first portion 110 and second portion 111.

Five (5) annular flanges are provided around the exterior of the spool guide 106. For example, a first flange 116 and a second flange 117 define a space therebetween for receiving an o-ring 118, and a third flange 120 and a fourth flange 121 define a space therebetween for receiving an o-ring 122. The o-rings 118 and 122 seal against the sidewalls of the water-diverting valve chamber 76 to prohibit flow of water therearound. A fifth flange 124 defines a space between itself and the fourth flange 121 for receiving a retaining clip 126. As shown in FIG. 3, slots 128 are provided through the body 26 into the water-diverting valve chamber 76. To hold the water-diverting valve 78 in position in the water-diverting valve chamber 76, the retaining clip 126 can be inserted through the slots 128 into the space between the fourth flange 121 and fifth flange 124.

As discussed above, the spool 104 is moveable between the outward position Q1 and inward position Q2 in the spool-receiving aperture 108. The spool 104 includes a spool body 132. A spool head 134 is formed at one end of the spool body 132, and a spool rim 136 is formed at the other end of the spool body 132 around an aperture 137 provided in the spool 104. The spool head 134 serves in attaching a button 138 to the water-diverting valve 78. When the wand 20 is assembled, the button 138 is provided through a hole 139 in the shell 22 allowing it to be depressed by a user. Furthermore, a spring 140 is received within the aperture 137. Moreover, the spool rim 136 serves in limiting travel of the spool 104. As discussed below, the spring 140 interfaces with the bottom wall of the water-diverting valve chamber 76, and serves in returning the spool 104 to the outward position Q1.

As shown in FIG. 3, four (4) flanges are provided around the exterior of the spool body 132 between the spool head 134 and spool rim 136. A first spool flange 142 and a second spool flange 143 define a space therebetween for receiving a seal ring 144, and a third spool flange 146 and a fourth spool flange 147 define a space therebetween for receiving a seal ring 148. The seal ring 148 serves to prohibit flow of water therearound, thereby prohibiting leakage from the spool-receiving aperture 108. Furthermore, the seal ring 144, and the first and second spool flanges 142 and 143, serve as a valve plug. For example, when the spool 104 is in the outward position Q1, the seal ring 144 interfaces with a shoulder 150 formed on the first portion 110 of the spool guide 106, and, when the spool 104 is in the inward position Q2, the seal ring 144 interfaces with a shoulder 152 formed on the sidewalls between the first and second sections 77A and 77B of the water-diverting valve chamber 76.

The shoulders 150 and 152 serve as valve seats which the seal ring 144 sealingly engages. For example, when the spool 104 is in the outward position Q1, and the seal ring 144 sealingly engages the shoulder 150, water is prohibited by the seal ring 144, and by the first and second spool flanges 142 and 143, from flowing through the spool-receiving aperture 108, and is directed into the first section 77A. Furthermore, when the spool 104 is in the inward position Q2, and the seal ring 144 sealingly engages the shoulder 152, water is prevented by the seal ring 144, and by the first and second spool flanges 142 and 143, from flowing into the first section 77A, and is directed through the spool-receiving aperture 108. As such, the positions of the spool 104, the outward position Q1 and inward position Q2, and the corresponding engagement of the seal ring 144 with either of the shoulders 150 and 152, serves in directing water flowing through the wand 20.

A user can actuate the wand 20 by depressing the button 138. The button 138 is attached to the spool head 134, and pivotably attached to a fulcrum 154 formed on the body 26. For example, at least one leg 156 can be provided depending from the underside of the button 138. The leg 156 includes a receiving slot 157 in which the fulcrum 154 can be pivotably attached. Pivotal movement of the button 138 serves to actuate the spool 104 between the outward position Q1 and inward position Q2. As such, pivotal movement of the button 138 serves in controlling flow of water through the wand 20. When water is flowing through the wand 20 and the spool 104 is in the outward position Q1, the water is directed by the water-diverting valve 78 through the first section 77A of the water-diverting valve chamber 76 into conduit B2, and out of the head region 36 and spray face 80 as a stream via aerator 98. Furthermore, when water is flowing through the wand and the spool 104 is in the inward position Q2, the water is directed by the water-diverting valve 78 through the spool-receiving aperture 108 into the conduit B3, and out of the head region 36 and spray face 80 as a spray via spray pattern 100. As such, pivotal movement of the button 138 serves to alternate the water exiting the wand 20 between a stream or a spray.

Moreover, flow of water through the wand 20 serves in maintaining the spool 104 of the water-diverting valve 78 in the inward position Q2. For example, when the button 138 is pivoted to position the spool 104 in the inward position Q2, the seal ring 144 sealingly engages the shoulder 152, and water is prevented from flowing into the first section 77A. Correspondingly, water flows over and exerts pressure on the second flange 143. The pressure of the water flowing over the second flange 143 is greater than the force of the spring 140, and the spool 104 is maintained in the inward position Q2. In effect, the spool 104 is biased in the inward position Q2 by the pressure exerted by the water flowing over the second flange 143. However, once the flow of water over the second flange 143 is discontinued, the spring 140 automatically returns the spool 104 to the outward position Q1 without the need for user intervention. As such, when the faucet is turned off, water flowing through the wand 20 will be discontinued, and, if the spool 104 was in the inward position Q2, then the spool 104 would be returned to the outward position Q1 by the spring 140. Consequently, when water again flows through the wand 20, the water would, absent user intervention, initially exit the wand 20 as a stream.

Another embodiment of the faucet wand of the present invention is generally indicated by the numeral 190 in FIGS.

4 and 6. The wand 190 includes a shell 192, 193, and a waterway 194 enclosed by the shell 192, 193. The waterway 194 includes a body 196 that is unitarily formed through any variety of molding processes. As discussed below, the body 196 can include various cavities and/or chambers formed therein.

Figure 5B:
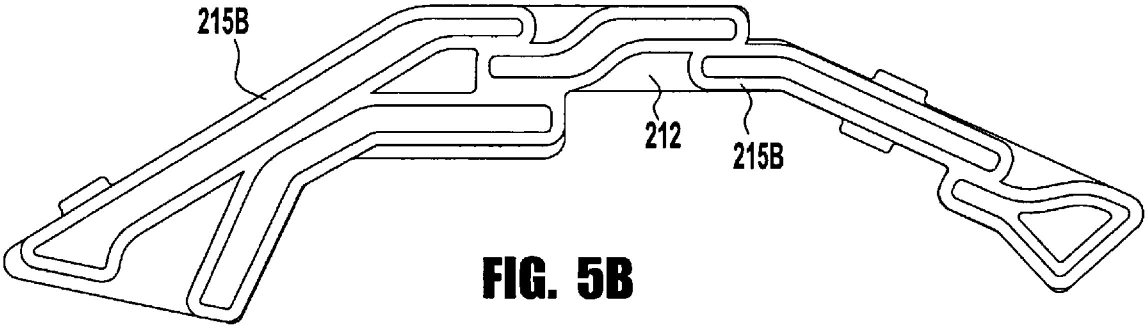
FIG. 5B is a side elevational view of the other side of the plate depicted in FIG. 5A.
Figure 5D:
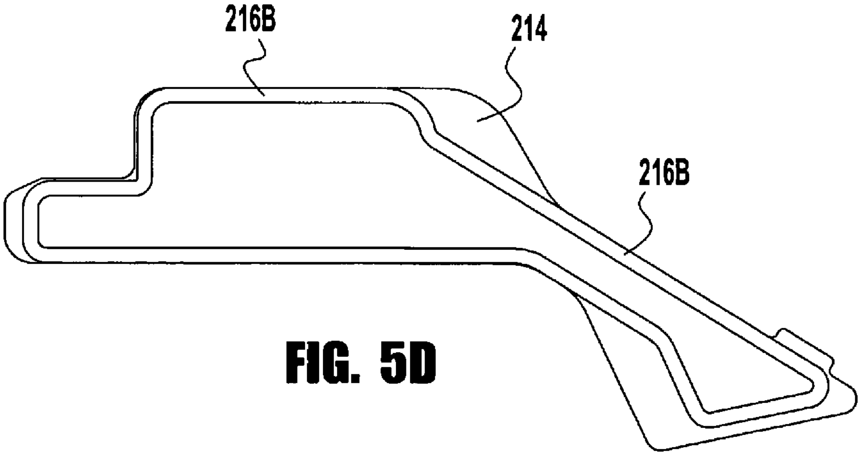
FIG. 5D is a side elevational view of the other side of the plate depicted in FIG. 5C.
Figure 5A:
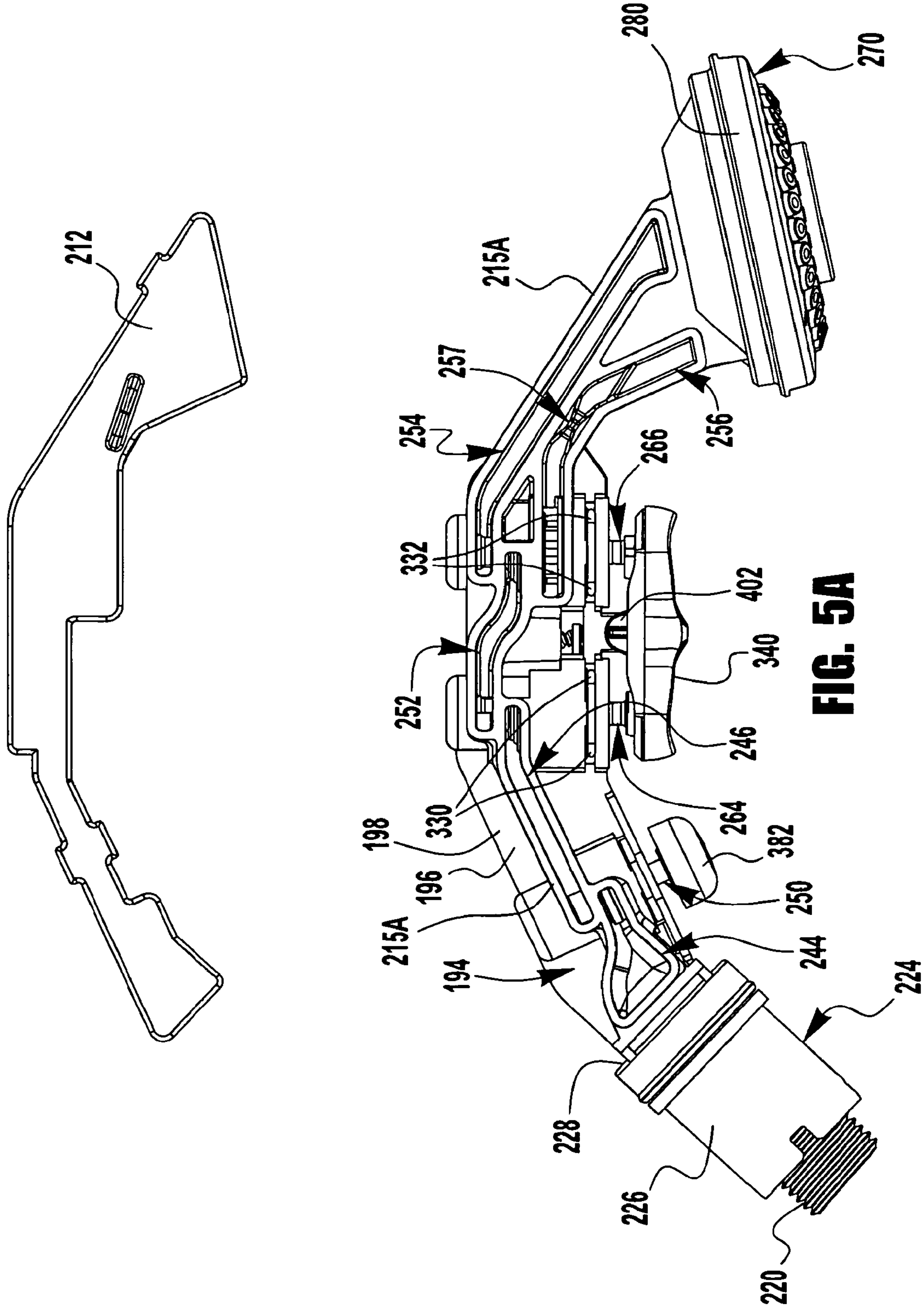
FIG. 5A is a side elevational view of one side of the waterway and one side of the plate ultimately attached to the one side of the waterway as depicted in FIG. 4.
Figure 5C:
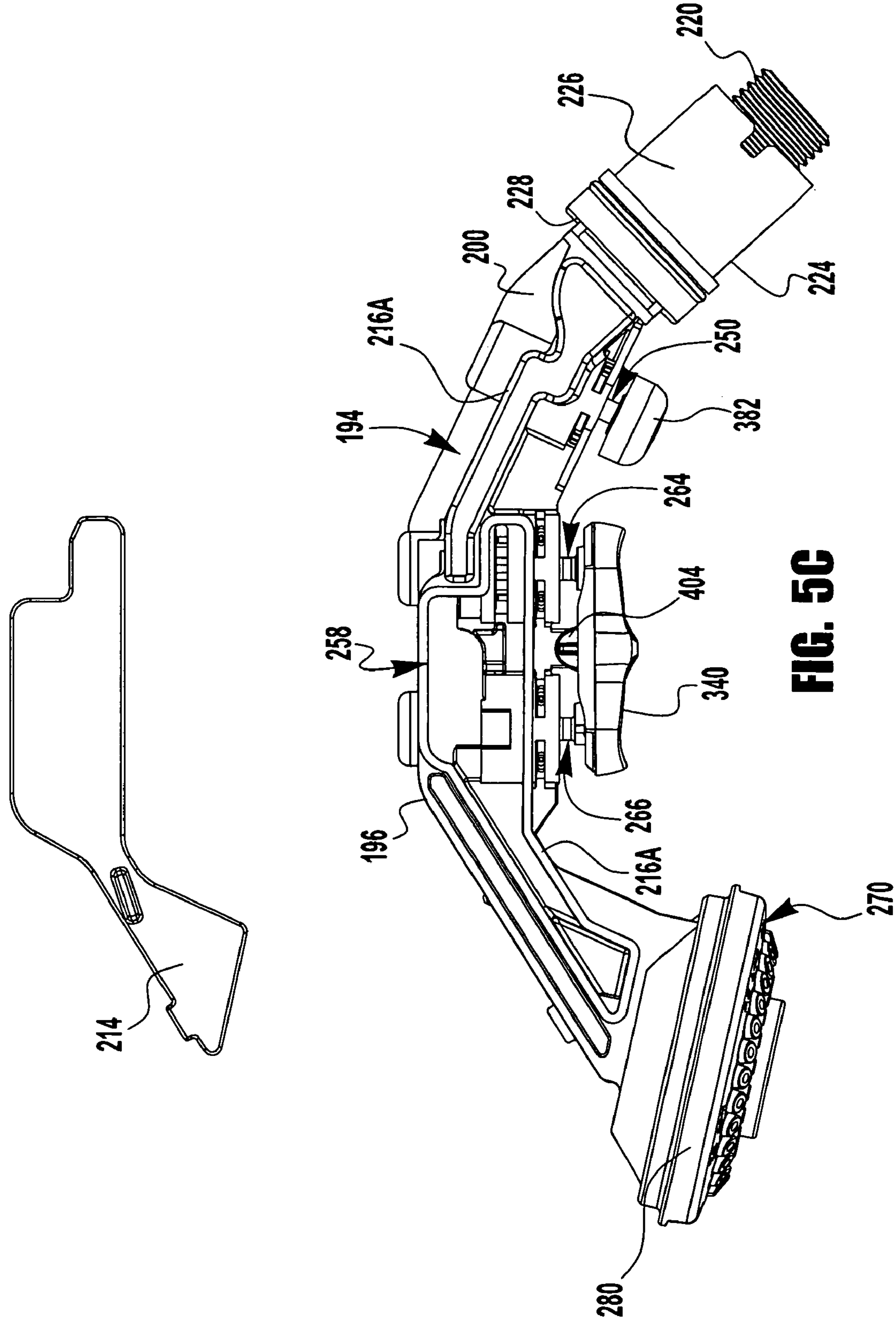
FIG. 5C is a side elevational view of the other side of the waterway and the other side of the plate ultimately attached to the other side of the waterway as depicted in FIG. 4.

The body 196 of the waterway 194 has a first side 198 (FIG. 5A) and a second side 200 (FIG. 5C). For the sake of this description, the body 196 is segregated into various regions. For example, the body 196 can include an inlet region 202, a first intermediate region 204, a second intermediate region 206, a third intermediate region 208, and a head region (or an outlet region) 210. The various regions can have various cavities and/or chambers selectively formed in the first and second sides 198 and 200.

The attachment of a first side plate 212 and a second side plate 214 to the sides 198 and 200, respectively, affords the formation of various conduits in the body 196. The first and second side plates 212 and 214 can be adhesively or mechanically attached or otherwise permanently affixed to the body 196. For example, adhesives can be provided on the body 196 and/or side plates 212 and 214 to facilitate attachment of the side plates 212 and 214 to the body 196. Furthermore, mechanical fasteners could be used to attach the side plates 212 and 214 to the body 196. Such mechanical fasteners could be provided through the side plates 212 and 214 into the body, and may require seals (such as gaskets or membranes) between the body 196 and side plates 212 and 214 to prohibit leakage.

The side plates 212 and 214 can also be welded to the body 196 using weld beads. For example, if the body 196 and side plates 212 and 214 are made of polymeric materials, weld beads 215A (FIG. 5A) can be provided on side 198 of the body 196, and weld beads 215B (FIG. 5B) can be provided on the side plate 212. Furthermore, weld beads 216A (FIG. 5C) can be provided on side 200 of the body 196, and weld beads 216B (FIG. 5D) can be provided on the side plate 214. The weld beads 215A and 216A can trace the perimeter of the cavities and/or chambers provided in the sides 198 and 200, respectively. To attach the side plates 212 and 214, the various weld beads can be initially melted using a hot plate (not shown), and thereafter attached to the sides 198 and 200, respectively. Once the melted weld beads 215A and 215B intermingle and cure, and the melted weld beads 216A and 216B intermingle and cure, the side plates 212 and 214 are permanently attached to the body 196.

Using the attachment of the first and second side plates 212 and 214 to cover the various cavities and/or chambers allows the various conduits formed thereby to have various shapes and sizes limited only by the molding process. For example, as discussed below, restrictions can be provided in the various conduits to aid in controlling the flow of water through the wand 190.

Figure 4:
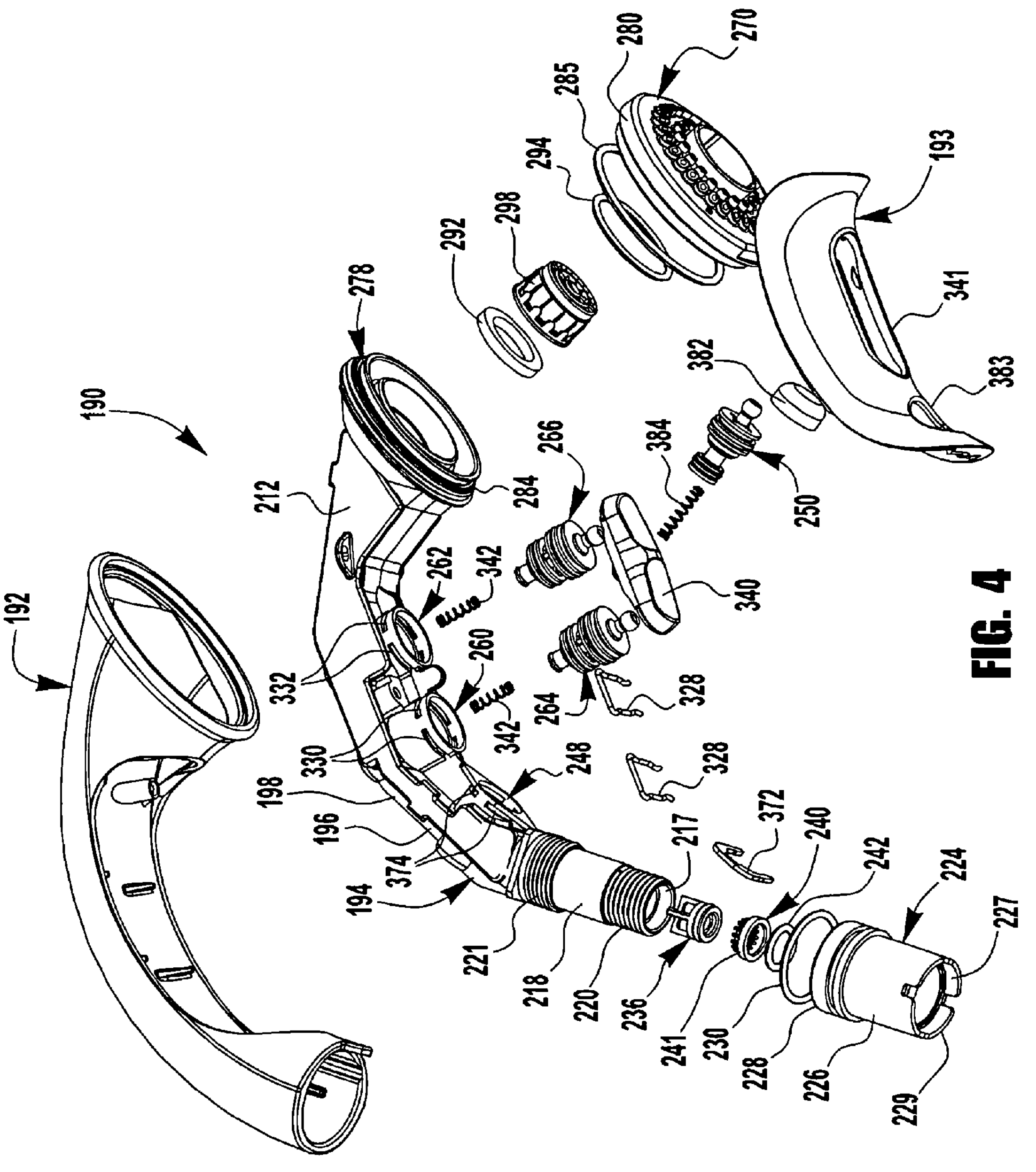
FIG. 4 is an assembly view of another embodiment of a faucet wand according to the present invention.
Figure 6:
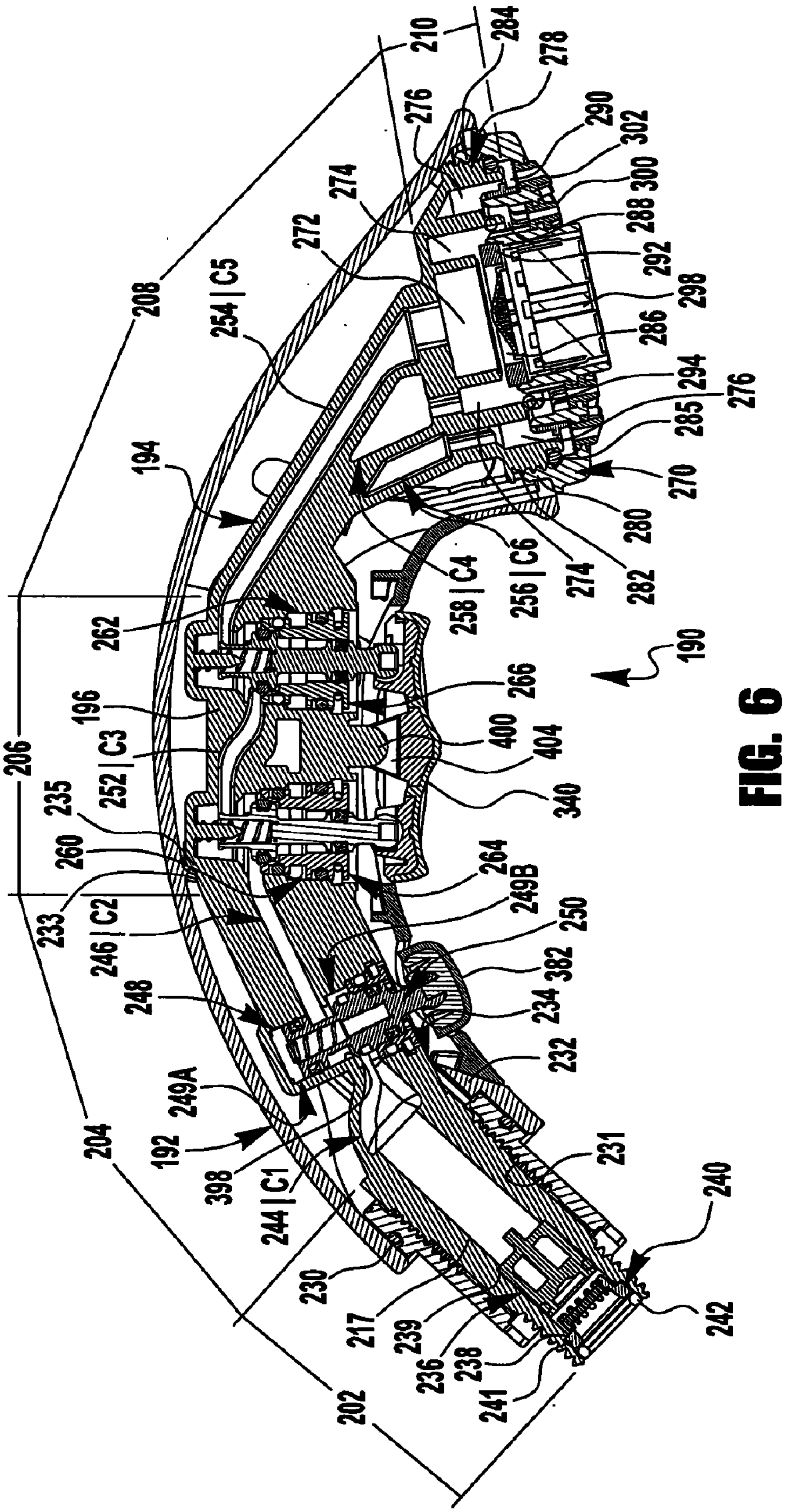
FIG. 6 is a cross-sectional view of the assembled faucet wand depicted in FIG. 4.

The inlet region 202 includes an inlet passage 217 extending therethrough. The inlet region 202 also includes an exterior surface 218 having first and second threads 220 and 221 formed thereon. The first threads 220 can be used in attaching the wand 190 to a water hose (not shown). Furthermore, the second threads 221 can be used to receive an attachment collar 224. The attachment collar 224 can be used to attach the shell 192 to the waterway 194. As shown in FIGS. 4 and 6, the attachment collar 224 includes an exterior surface 226 and an interior surface 227 extending between a first end 228 and a second end 229. A seal ring 230 can be provided around the exterior surface 226, and threads 231 are provided on the interior surface 227. After the waterway 194 has been provided in the shell 192, the attachment collar 224 can be received around the inlet region 202 to aid in attaching the shell 192 and waterway 194 together.

When the attachment collar 224 is received on the body 196, the shell 192 can be clamped between the body 196 and attachment collar 224. For example, as the threads 221 and threads 231 threadedly engage one another, the inlet region 202 (of the waterway 194) is drawn through the interior of the attachment collar 224. When the inlet region 202 is drawn through the interior of the attachment collar 224, protrusions 232 and 233 formed on the interior of the shell 192 are clamped between the first end 228 of the attachment collar 224 and the body 194 at 234 and 235. As such, use of the attachment collar 224 aids in securing the attachment of the shell 192 to the waterway 194. If necessary, mechanical fasteners (not shown) can also be used to further secure the attachment of the shell 192 and waterway 194.

A check valve 236 can be provided in the inlet passage 217 to allow forward flow and prohibit backward flow of water through the wand 190. For example, the inlet passage 217 includes a first shoulder 238 and a second shoulder 239, and a screen 240 can be provided adjacent the check valve 236 to catch particulate in the water before it flows through the wand 190. The screen 240 includes a flange 241 which interfaces with the shoulder 238. The check valve 236 is positioned between the shoulder 239 and screen 240, and is moveable between positions allowing forward flow and positions prohibiting backward flow of water through the inlet passage 217. If necessary, an o-ring 242 can be provided in the inlet passage 217 to seal against the water hose supplying water to the wand 190.

As shown in FIG. 5A, a cavity 244 is formed in the first intermediate region 204 (on the first side 198), and cavity 246 is formed in both the first intermediate region 204 and second intermediate region 206 (on the first side 198). When the side plate 212 is attached to the first side 198, the cavities 244 and 246 are enclosed to become fluid conduits C1 and C2. The fluid conduits C1 and C2 facilitate flow of water through the first intermediate region 204 and a portion of the second intermediate region 206. The fluid conduits C1 and C2 are interconnected by a pause or reset valve chamber 248 formed in the first intermediate region 204.

The pause valve chamber 248 can be generally cylindrical having a first section 249A and a second section 249B. The pause valve chamber 248 is configured to receive a pause or reset valve 250. As discussed below, the pause valve 250 is configured to interrupt the flow of water through the body 196 upon actuation. That is, the pause valve 250 in an unactuated outward position S1 allows the flow of water therethrough (from the conduit C1 to the conduit C2), and in an actuated inward position S2 prohibits the flow of water therethrough (between the conduits C1 and C2).

As discussed above, the conduit C2 extends into the second intermediate region 206. In addition to the conduit C2, the second intermediate region 206 includes conduits C3, C4, C5, and C6. The conduits C3, C5 and C6 are formed when the first side plate 212 is attached to the body 196 to enclose various cavities formed in the first side 198. For example, as depicted in FIG. 5A, when attached to the first side 198, the first side plate 212 encloses a cavity 252 in the second intermediate region 206 to form the conduit C3, a cavity 254 in the second intermediate region 206 and third intermediate region 208 to form the conduit C5, and a cavity 256 in the second intermediate region 206 and third intermediate region 208 to form the conduit C6. As depicted in FIG. 5A, a restriction 257 can be provided in cavity 256 to aid the control of water flowing through the conduit C6. Furthermore, as depicted in FIG. 5C, the conduit C4 is formed when the second side plate 214 is attached to enclose a cavity 258 formed on the second side 200 in the second intermediate region 206 and third intermediate region 208.

The conduit C2 is interconnected with the conduits C3 and C4 by a first water-diverting valve chamber 260, and the conduit C3 is interconnected with the conduits C5 and C6 by a second water-diverting valve chamber 262. The first and second water-diverting valve chambers 260 and 262 can be generally cylindrical each having a first section 263A and a second section 263B, and are configured to receive first and second water-diverting valves 264 and 266, respectively. The first and second water-diverting valves 264 and 266 can include components that can be actuated between two positions, an outward position P1 and an inward position P2, to divert water to one of two conduits. For example, in the outward position P1 (FIGS. 7 and 9), the first water-diverting valve 264 diverts water from the conduit C2 to the conduit C3, and, in the inward position P2 (FIG. 8), the first water-diverting valve 264 diverts water from the conduit C2 to the conduit C4. Furthermore, in the outward position P1 (FIG. 7), the second water-diverting valve 266 diverts water from the conduit C3 to the conduit C5, and, in the inward position P2 (FIG. 9), the second water-diverting valve 266 diverts water from the conduit C3 to the conduit C6.

The diversion of water afforded by the actuation of the first and second water-diverting valves 264 and 266 serves to direct water to various output chambers in the head region 210 and through, as discussed below, corresponding output patterns in a spray face 270. The head region 210 includes a first chamber 272, a second chamber 274, and a third chamber 276. The first chamber 272 can have a circular shape, and the second and third chambers 274 and 276 can be successive annular ring shapes surrounding the first chamber 272. As shown in FIG. 6, the first chamber 272 communicates with the conduit C5, the second chamber 274 communicates with the conduit C4, and the third chamber 276 communicates with the conduit C6.

The spray face 270 is attached to the body 196 around the perimeter 278 of the head region 210. The spray face 270 includes a rim 280 and threads 282 formed around the interior of the rim 280. When the spray face 270 is attached to the head region 210, the threads 282 engage threads 284 formed around the perimeter 278. An o-ring 285 can be provided around the perimeter 278 to sealingly engage the rim 280, thereby prohibiting water from leaking between the body 196 and spray face 270.

The spray face 270 includes an interior cavity having a first chamber 286, a second chamber 288, and a third chamber 290. When the spray face 270 is attached to the body 196, the first chamber 286 communicates with the first chamber 272, the second chamber 288 communicates with the second chamber 274, and the third chamber 290 communicates with the third chamber 276. Seal rings 292 and 294 are provided between the head region 210 and spray face 270. The seal ring 292 serves in prohibiting water from leaking from the first chamber 272 and first chamber 286 to the second chamber 274 and second chamber 288. Furthermore, the seal ring 294 serves in prohibiting water from leaking from the second chamber 274 and second chamber 288 to the third chamber 276 and third chamber 290.

The first, second, and third chambers 286, 288, and 290 correspond to various output patterns provided in the spray face 270. For example, the first chamber 286 is provided with an aerator 298, the second chamber 288 communicates through the spray face 270 via an inner spray pattern 300, and the third chamber 290 communicates through the spray face 270 via an outer spray pattern 302. As such, water flowing through the first chamber 272 (from conduit C5) into the first chamber 286 exits the wand 190 through the aerator 298 as a stream. Water flowing through the second chamber 274 (from conduit C4) into the second chamber 288 exits the wand 190 through the inner spray pattern 300 as a first spray. Water flowing through the third chamber 276 (from conduit C6) into the third chamber 290 exits the wand 190 through the outer spray pattern 302 as a second spray. As such, depending on the positions of the first and second water-diverting valves 264 and 266, water exits the wand 190 as a stream through the aerator 298, as the first spray through the inner spray pattern 300, or as the second spray through the outer spray pattern 302.

As shown in FIGS. 4 and 6, and 7-9, the first and second water-diverting valves 264 and 266 can be pressure-biased valves. As such, the first and second water-diverting valves 264 and 266 each include a spool 306 and a spool guide 308. The spool guide 308 of the first and second water-diverting valves 264 and 266 is received in the second section 263B of the first and second water-diverting valve chambers 260 and 262. The spool guide 308 includes a spool-receiving aperture 310 that can be generally cylindrical. The spool-receiving aperture 310 defines the path of reciprocal movement of the spool 306 between the outward position P1 and inward position P2. The spool guide 308 includes a first portion 312 and a second portion 313 joined by two (2) connecting legs 314. The connecting legs 314 define passageways (not shown) therebetween allowing the passage of water through the spool-receiving aperture 310 to an annular channel 316 formed around the spool guide 308 between the first portion 312 and second portion 313.

Five (5) annular flanges are provided around the exterior of the spool guide 308. For example, a first flange 318 and a second flange 319 define a space therebetween for receiving an o-ring 320, and a third flange 322 and a fourth flange 323 define a space therebetween for receiving an o-ring 324. The o-rings 320 and 324 seal against the sidewalls of the first and second water-diverting valve chambers 260 and 262 to prohibit flow of water therearound. A fifth flange 326 defines a space between itself and the fourth flange 323 for receiving a retaining clip 328. As shown in FIG. 4, slots 330 and slots 332 are provided through the body 196 into the first and second water-diverting valve chambers 260 and 262, respectively. One retaining clip 328 can be inserted through the slots 330 into the space between the fourth flange 323 and fifth flange 326 to hold the first water-diverting valve 264 in position in the first water-diverting valve chamber 260, and another retaining clip 328 can be inserted through the slots 332 into the space between the fourth flange 323 and fifth flange 326 to hold the second water-diverting valve 266 in position in the second water-diverting valve chamber 260.

As discussed above, the spool 306 is moveable between the outward position P1 and inward position P2 in the spool-receiving aperture 310. The spool 306 includes a spool body 334. A spool head 336 is formed at one end of the spool body 334. Furthermore, a spool rim 338 is formed at the other end of the spool body 334 around an aperture 339 provided in the spool 306. The spool head 336 serves in attaching a toggle button 340 to the first and second water-diverting valves 264 and 266. When the wand 190 is assembled the button 340 is provided through a hole 341 in the shell 193 so that the first and second water-diverting valves 264 and 266 can be actuated (via pivotal movement of the toggle button 340). Furthermore, a spring 342 is received within the aperture 339, and the spool rim 338 serves in limiting travel of the spool 306. As discussed below, the spring 342 interfaces with the bottom walls of the first and second water-diverting valve chambers 260 and 262, and serves in returning the spool 306 to the outward position Pl.

Figure 7:
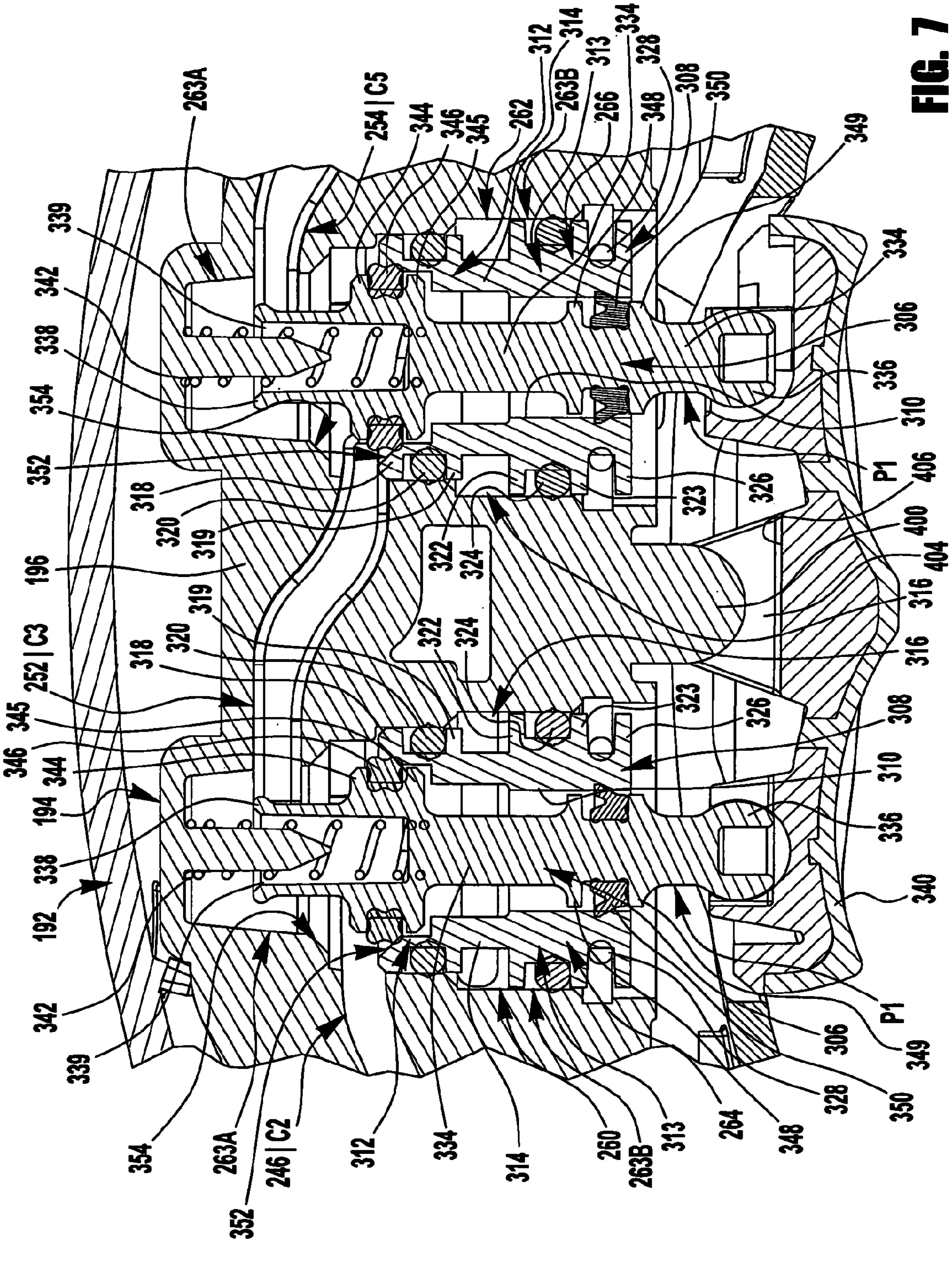
FIG. 7 is an enlarged cross-sectional view of a portion of FIG. 6 depicting a first water-diverting valve in an outward position and a second water-diverting valve in an outward position.
Figure 8:
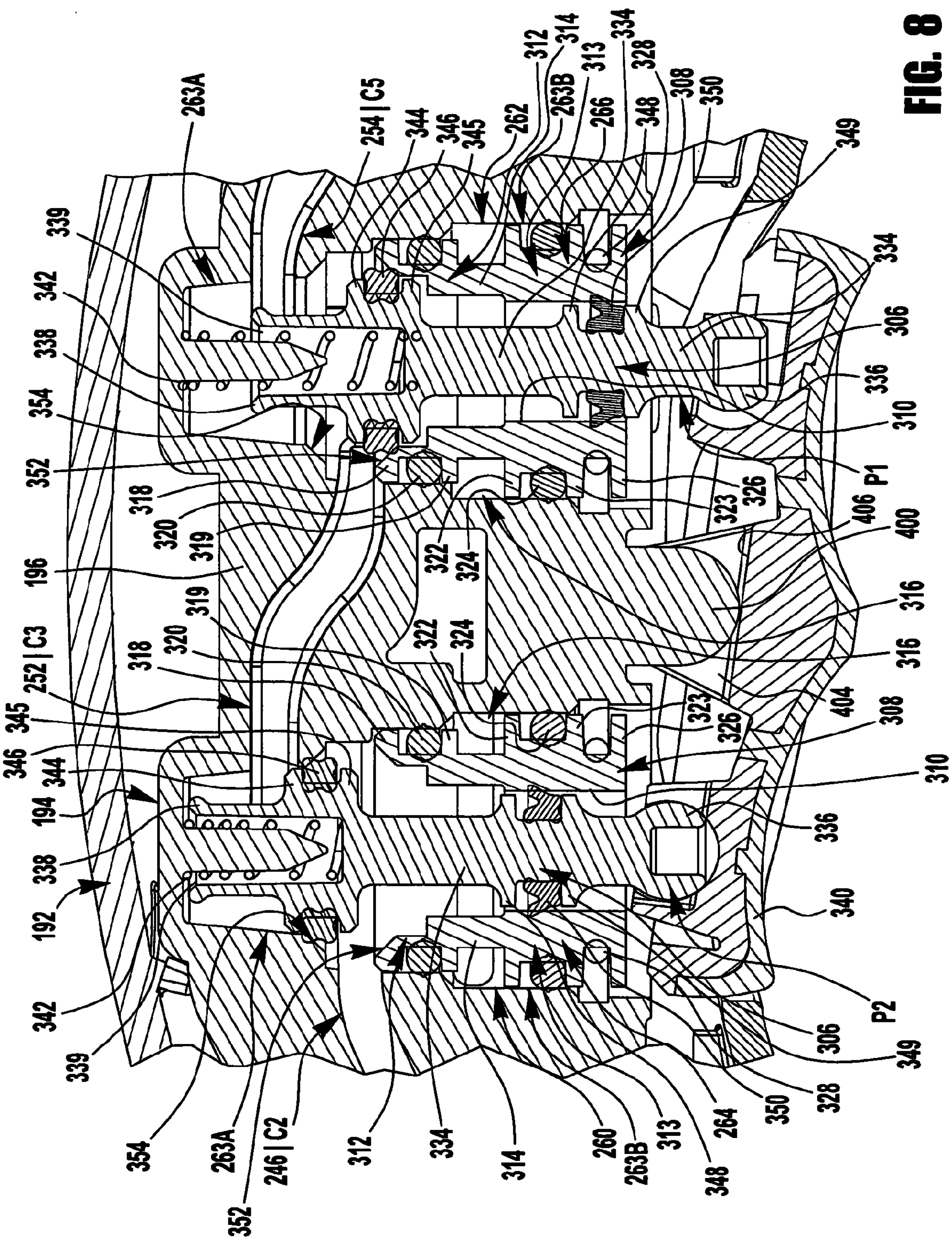
FIG. 8 is an enlarged cross-sectional view of a portion of FIG. 6 depicting the first water-diverting valve in an inward position and the second water-diverting valve in the outward position.
Figure 9:
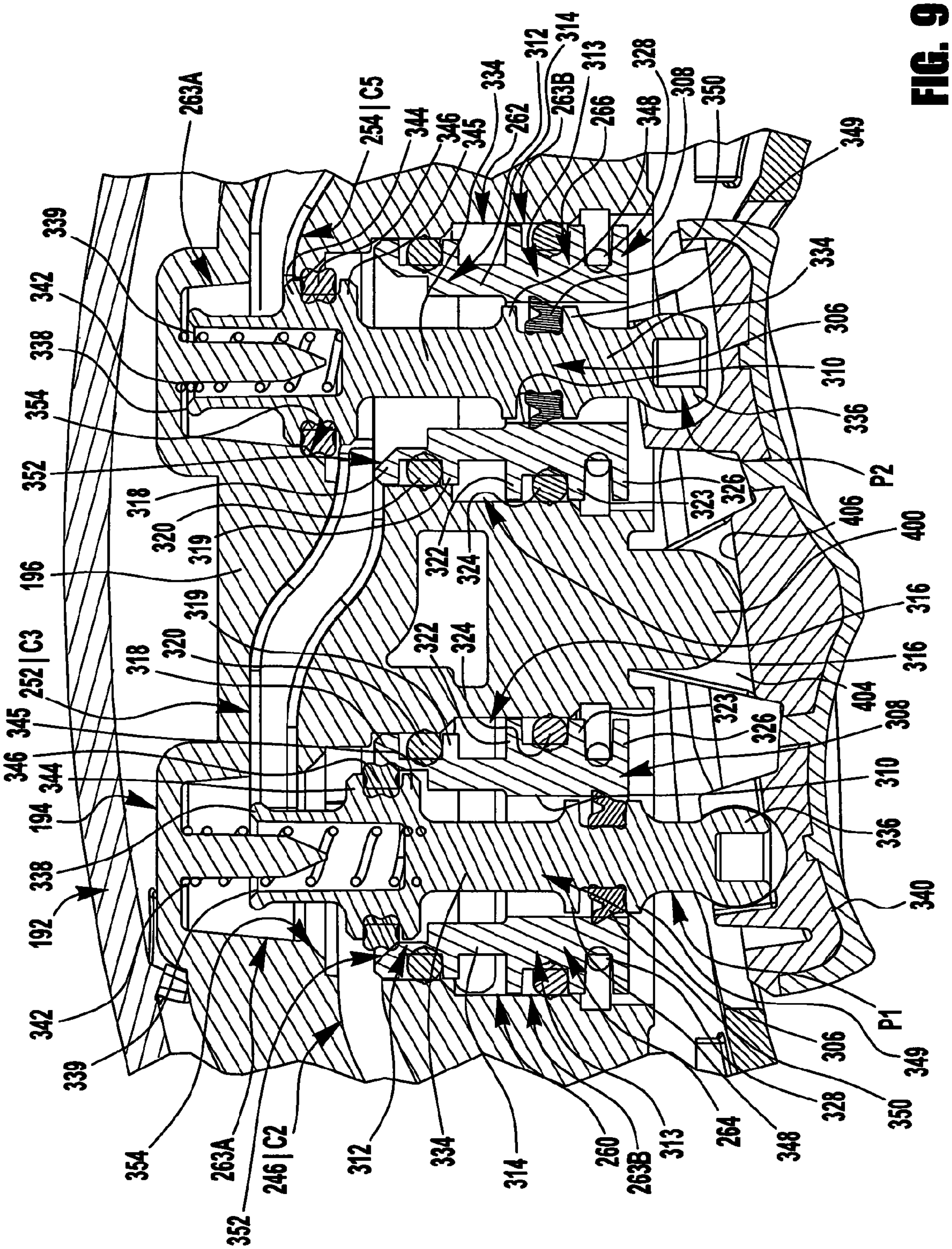
FIG. 9 is an enlarged cross-sectional view of a portion of FIG. 6 depicting the first water-diverting valve in the outward position and the second water-diverting valve in an inward position.

As shown in FIG. 7-9, four (4) flanges are provided around the exterior of the spool body 334 between the spool head 336 and spool rim 338. A first spool flange 344 and a second spool flange 345 define a space therebetween for receiving a seal ring 346, and a third spool flange 348 and a fourth spool flange 349 define a space therebetween for receiving a seal ring 350. The seal ring 350 serves to prohibit flow of water therearound, thereby prohibiting leakage from the spool-receiving aperture 310. Furthermore, the first and second spool flanges 344 and 345 and the seal ring 346 serve as a valve plug. For example, when the spool 306 is in the outward position P1, the seal ring 346 interfaces with a shoulder 352 formed on the first portion 312 of the spool guide 308, and, when the spool 306 is in the inward position P2, the seal ring 346 interfaces with a shoulder 354 formed on the sidewalls between the first and second sections 263A and 263B of the first and second water-diverting valve chambers 260 and 262.

The shoulders 352 and 354 serve as valve seats which the seal ring 346 sealingly engages. For example, when the spool 306 is in the outward position P1, and the seal ring 346 sealingly engages the shoulder 352, water is prohibited by the seal ring 346, and by the first and second spool flanges 344 and 345, from flowing through the spool-receiving aperture 310, and is directed into the first section 263A (of the first and second water-diverting valve chambers 260 and 262). Furthermore, when the spool 306 is in the inward position P2, and the seal ring 346 sealingly engages the shoulder 354, water is prevented by the seal ring 346, and by the first and second spool flanges 344 and 345, from flowing into the first section 263A (of the first and second water-diverting valve chambers 260 and 262), and is directed through the spool-receiving aperture 310. As such, the positions of the spool 306 and corresponding engagement of the seal ring 346 with either of the shoulders 352 and 354 serve in directing water flowing through the wand 190.

Flow of water through the wand 190 serves in maintaining the spools 306 of the first and second water-diverting valves 264 and 266 in the inward position P2. For example, when the spool 306 is in the inward position P2, the seal ring 346 sealingly engages the shoulder 354, and water is prevented from flowing in the first section 263A. Correspondingly, water flows over and exerts pressure on the second flange 345. The pressure of the water flowing over the second flange 345 is greater than the force of the spring 342, and the spool 306 is maintained in the inward position P2. In effect, the spool 306 is biased in the inward position P2 by the pressure exerted by the water flowing over the second flange 345. However, once the flow of water over the second flange 345 is discontinued, the spring 342 serves to return the spool 306 to the outward position P1.

Figure 6A:
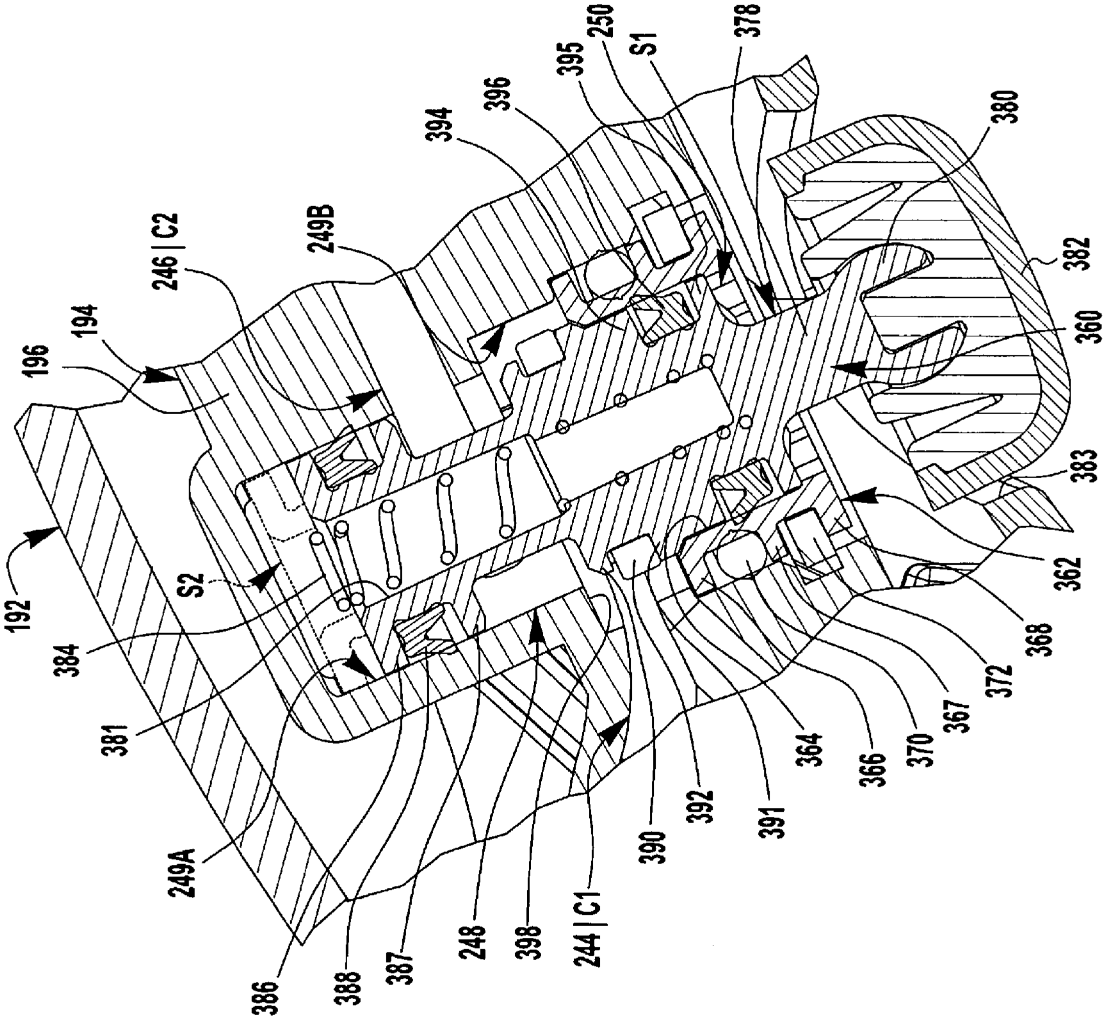
FIG. 6A is an enlarged cross-sectional view of a portion of FIG. 6 depicting a pause or reset valve incorporated in the faucet wand.

The pause valve 250 is provided to discontinue flow of water to the first and second water-diverting valves 264 and 266. As such, if the spool 306 of either the first or second water-diverting valve 264 or 266 is in the inward position P2, the actuation of the pause valve 250 serves to return the spool 306 to the outward position P1. As shown in FIG. 6A, the pause valve 250 includes spool 360 and a spool guide 362. The spool guide 362 is received in the second section 249B of the pause chamber 248. The spool guide 362 includes a spool-receiving aperture 364 that can be generally cylindrical, and defines the path of reciprocal motion of the spool 360 between an outward position S1 and an inward position S2.

Three (3) annular flanges are provided around the exterior of the spool guide 362. For example, a first flange 366, a second flange 367, and a third flange 368 are provided. The first and second flanges 366 and 367 define an area therebetween for receiving an o-ring 370. The o-ring 370 serves to prohibit water from leaking between the spool guide 362 and sidewalls of the pause chamber 248. The third flange 368 defines a space between itself and the second flange 367 for receiving a retaining clip 372. As shown in FIG. 4, slots 374 are provided through the body 196 into the pause chamber 248. To hold the pause valve 250 in position, the retaining clip 372 can be inserted through the slots 374 into the space between the second flange 367 and third flange 368.

As discussed above, the spool 360 is moveable between the outward position S1 and inward position S2 in the spool-receiving aperture 364. The spool 360 includes a pause spool body 378. At one end, a spool head 380 is formed on the pause spool body 378, and, at the other end, an aperture 381 is provided through the pause spool body 378. The spool head 380 serves in attaching a button 382. When the wand 190 is assembled, the button 382 is provided through a hole 383 in the shell 193 so that the pause valve 250 can be actuated. A spring 384 is received within the aperture 381. The spring 384 interfaces with the bottom wall of the pause chamber 248, and serves in biasing the spool 360 to the outward position.

As shown in FIG. 6A, six (6) flanges are provided around the exterior of the pause spool body 378. A first pause spool flange 386 and a second pause spool flange 387 define a space therebetween for receiving a seal ring 388, a third pause spool flange 390 and a fourth pause spool flange 391 define a space therebetween for receiving a seal ring 392, and a fifth pause spool flange 394 and a sixth pause spool flange 395 define a space therebetween for receiving a seal ring 396. The seal ring 388 serves to prohibit flow of water therearound into the first section 249A of the pause chamber 248. Furthermore, the seal ring 396 serves to prohibit flow of water therearound, thereby prohibiting leakage from the pause chamber 248.

Additionally, the seal ring 392, and the third and fourth pause spool flanges 390 and 391 serve as a valve plug. For example, when the spool 360 is actuated into the inward position S2 from the outward position S1, the seal ring 392 interfaces with a shoulder 398 formed between the first and second sections 249A and 249B of the pause chamber 248. The shoulder 398 serves as a valve seat which the seal ring 392 sealingly engages. When the spool 360 is in the inward position S2, and the seal ring 392 sealingly engages the shoulder 398, water is prevented by the seal ring 392 and the third and fourth pause spool flanges 390 and 391 from flowing into the first section 249A. As such, when the spool 360 is in the inward position S2, the seal ring 392 and the third and fourth pause spool flanges 390 and 391 discontinue flow of water through the remainder of the wand 190.

A user can actuate the first and second water-diverting valves 264 and 266 of the wand 190 by depressing the toggle button 340. The toggle button 340 is attached to the spool heads 336 of both the first and second water-diverting valves 264 and 266, and is capable of pivoting on a fulcrum 400 formed on the body 196. The toggle button 340 includes a first depending leg 402 (FIG. 5A) and a second depending leg 404 (FIG. 5C) which receive the fulcrum 400 therebetween. The toggle button 340 is not attached to the fulcrum 400, but instead floats on the fulcrum 400 until either the first water-diverting valve 264 or the second water-diverting valve 266 is depressed into the inward position P2. When either the first water-diverting valve 264 or the second water-diverting valve is depressed into the inward position P2, a pivot surface 406 provided between the first and second depending legs 402 and 404 contacts the fulcrum 400 to afford pivotal movement of the toggle button 340. Because the toggle button 340 floats on the fulcrum 400, the pivot surface 406, if necessary, can slide on the fulcrum 400 to afford increased play between the spools 306 of the first and second water-diverting valves 264 and 266. As such, when the second water-diverting valve 266 is actuated into the inward position P2, the interaction between the fulcrum 400 and pivot surface 406 compels the first water-diverting valve 264 into the outward position P1, and when the first water-diverting valve 264 is actuated into the inward position P2, the same interaction compels the second water-diverting valve 266 into the outward position P1.

Pivotal movement of the toggle button 340 and the use of the pause valve 250 serves in actuating the spools 306 of the first and second water-diverting valves 264 and 266 between their corresponding outward positions P1 and inward positions P2. As such, pivotal movement of the toggle button 340 and the use of the pause valve 250 can serve in controlling flow of water through the wand 190. Depending on the positions of the spools 306 of the first and second water-diverting valves 264 and 266, water flowing through the wand 190 is ultimately directed through the conduit C5 to exit the wand 190 as a stream, the conduit C4 to exit the wand 190 as the first spray, or the conduit C6 to exit the wand 190 as the second spray. As discussed below, the pause valve 250 serves to return the first and second water-diverting valves 264 and 266 to the outward position P1 to allow water to exit the wand 190 as a stream, and pivotal movement of the toggle button 340 serves to alternate the water exiting the wand 190 between the first spray and second spray.

For example, when the spools 306 of both the of the water-diverting valves 264 and 266 are in the outward position P1, water exits the wand 190 as a stream. For example, when water is flowing through the wand 190, and the spools 306, as shown in FIG. 7, are both in the outward position P1, the water is directed by the first-water-diverting valve 264 from the conduit C2 into the conduit C3, and, thereafter, the water is directed by the second water-diverting valve 266 from the conduit C3 into the conduit C5. Because the conduit C5 communicates with the aerator 298 via the first chamber 272 (formed in the head region 210) and the first chamber 286 (formed in the spray face 270), the water exits the wand 190 as the stream.

Furthermore, when the toggle button 340 is pivoted such that the spool 306 of the first water-diverting valve 264 is in the inward position P1, water exits the wand 190 as the first spray. For example, when water is flowing through the wand 190, and the spool 306 of the first water-diverting valve 264 is in the inward position P2, as shown in FIG. 8, the water is directed from the conduit C2 into the conduit C4. As such, the water bypasses the second water-diverting valve 266 (which is in the outward position P2) to exit the wand 190, and, because the conduit C4 communicates with the inner spray pattern 300 via the second chamber 274 (formed in the head region 210) and the second chamber 288 (formed in the spray face 270), the water exits the wand as the first spray.

When the toggle button 340 is pivoted such that the spool 306 of the first water-diverting valve 264 is in the outward position P1 and the spool 306 of the second water-diverting valve 266 is in the inward position P2, water exits the wand 190 as the second spray. For example, when water is flowing through the wand 190, and the spool 306 of the first water-diverting valve 264 is in the outward position P1 and the spool 306 of the second water-diverting valve 266 is in the inward position P2, as shown in FIG. 9, the water is directed by the first water-diverting valve 264 from the conduit C2 into the conduit C3, and, thereafter, the water is directed by the second water-diverting valve 266 from the conduit C3 into the conduit C6. Because the conduit C6 communicates with the outer spray pattern 302 via the third chamber 276 (formed in the head region 210) and the third chamber 290 (formed in the spray face 270), the water exists the wand 190 as the second spray.

Once either of the spools 306 of the first and second water-diverting valves 264 and 266 are actuated (by pivotal movement of the toggle button 340) into the inward position P2, flow of water through the wand 190, as discussed above, serves in maintaining that spool 306 in the inward position P2. For example, when the toggle button 340 is pivoted so that one of the spools 306 is in the inward position P2, water flows over and exerts pressure on the second flange 345. The pressure of the water flowing over the second flange 345 maintains the spool 306 in the inward position P2. However, once the flow of water over the second flange 345 is discontinued, the spring 342 automatically returns the spool 306 to the outward position P1 without the need for user intervention. As such, when the faucet is turned off or the pause valve 250 is actuated, water flowing through the wand 190 will be discontinued, and, if either of the spools 306 is in the inward position P2, then that spool 306 would be reset to the outward position P1 by the spring 342. Consequently, when water again flows through the wand 190, the water would, absent user intervention, initially exit the wand 190 as a stream.

While in accordance with the Patent Statutes, only the best mode and exemplary embodiments have been presented and described in detail, it is to be understood that the invention is not limited thereto or thereby.

The invention claimed is:

1. A faucet wand, comprising:

a waterway through which water can flow, the waterway including:

a body having a first cavity and a second cavity provided therein, the first cavity and the second cavity extend along a longitudinal direction of the body, an inlet passage upstream of the first cavity, and a head region downstream of the first and second cavities and located at one longitudinal end of the body, wherein the first cavity is upstream of the second cavity and the body is unitarily formed from a single piece of material; and a solid plate operable to be attached to the body, in a fluid tight manner, the attachment of the plate to the body encloses at least one of the first cavity and the second cavity and forms a conduit in the waterway;

a spray face downstream of the first and second cavities, the spray face operable to be connected to the head region of the body, wherein the spray face extends along a different plane than a central longitudinal plane of the head region when the spray face is connected to the head region;

a shell with a portion of the body with the first and second cavities, the plate, and a portion of the spray face within the shell;

wherein, when the plate is attached to the body, in a fluid tight manner, water can flow through the conduit along a path that is generally parallel to a plane of the plate; and a valve disposed between the first cavity and the second cavity, wherein the valve controls the fluid communication between the first cavity and the second cavity.

2. The faucet wand of claim 1, wherein:

the attachment of the plate to the body, in a fluid tight manner, encloses the first cavity and the second cavity and forms a first conduit and a second conduit in the waterway; and when the plate is attached to the body, in a fluid tight manner, water can flow through the first conduit and the second conduit along the path that is generally parallel to the plate of the plate.

3. The faucet wand of claim 1, wherein the cavity that is not enclosed by the plate is formed in and enclosed by the body.

4. The faucet wand of claim 2, wherein:

the body further including a third cavity provided therein, the third cavity extending along the longitudinal direction of the body;

wherein the attachment of the plate to the body encloses the third cavity, in a fluid tight manner, and forms a third conduit in the waterway;

the valve disposed between the first conduit and the second conduit and also between the first conduit and the third conduit; and the valve controls the fluid communication between the first conduit and the second conduit and between the first conduit and the third conduit.

5. The faucet wand of claim 4, wherein:

the body further including a first outlet passage and a second outlet passage provided therein;

the inlet passage in fluid communication with the first conduit;

the first outlet passage in fluid communication with the second conduit; and the second outlet passage in fluid communication with the third conduit.

6. The faucet wand of claim 5, wherein:

the spray face defines a first output pattern and a second output pattern;

the first outlet passage in fluid communication with the first output pattern; and the second outlet passage in fluid communication with the second output pattern.

7. The faucet wand of claim 1, wherein:

a longitudinal length of at least one of the first cavity and the second cavity is greater than its transverse length; and a longitudinal length of the plate is greater than its transverse length.

8. The faucet wand of claim 1, wherein:

a cross-sectional shape of at least one of the first cavity and the second cavity is non-linear along its longitudinal length; and a shape of the plate is non-linear along its longitudinal length.

9. The faucet wand of claim 8, wherein:

the cross-sectional shape of at least one of the first cavity and the second cavity forms an obtuse angle along its longitudinal length; and the shape of the plate forms an obtuse angle along its longitudinal length.

10. The faucet wand of claim 9, wherein:

the cross-sectional shape of at least one of the first cavity and the second cavity forms a plurality of obtuse angles along its longitudinal length; and the shape of the plate forms a plurality of obtuse angles along its longitudinal length.

11. A faucet wand, comprising:

a waterway through which water can flow, the waterway including:

a body having a first cavity, a second cavity, and a third cavity provided therein, the first cavity, the second cavity, and the third cavity extending along a longitudinal direction of the body; and a solid plate operable to be attached to the body, in a fluid tight manner, the attachment of the plate to the body encloses at least one of the first cavity, the second cavity, and the third cavity in a fluid tight manner, and forms a conduit in the waterway;

the body having an inlet passage and a first outlet passage;

the inlet passage in fluid communication with the first cavity;

the first outlet passage in fluid communication with the second cavity;

wherein, when the plate is attached to the body, water can flow through the conduit along a path that is generally parallel to a plane of the plate;

a valve disposed between the first cavity and the third cavity, wherein the valve controls the fluid communication between the first cavity and the third cavity;

a spray face operable to be attached to the body at one longitudinal end, wherein the spray face extends along a different plane than a central longitudinal plane of the body where the connection of the spray face to the body is made;

wherein the first cavity, the second cavity, and the third cavity are upstream of the spray face;

the spray face defining a first output pattern;

the first outlet passage in fluid communication with the first output pattern; and a shell with a portion of the body, a portion of the valve, and the plate within the shell.

12. The faucet wand of claim 11, wherein:

the attachment of the plate to the body, in a fluid tight manner, encloses the first cavity and the second cavity and forms a first conduit and a second conduit in the waterway; and when the plate is attached to the body, in a fluid tight manner, water can flow through the first conduit and the second conduit along the path that is generally parallel to the plane of the plate.

13. The faucet wand of claim 11, wherein the cavity that is not enclosed by the plate is formed in and enclosed by the body.

14. The faucet wand of claim 12, wherein:

the attachment of the plate to the body, in a fluid tight manner, encloses the third cavity and forms a third conduit in the waterway;

the valve disposed between the first conduit and the second conduit and also between the first conduit and the third conduit; and the valve controls the fluid communication between the first conduit and the second conduit and between the first conduit and the third conduit.

15. The faucet wand of claim 14, wherein:

the body further including a second outlet passage provided therein;

wherein the second outlet passage is in fluid communication with the third conduit.

16. The faucet wand of claim 15, wherein:

the spray face further defines a second output pattern; and the second outlet passage in fluid communication with the second output pattern.

17. The faucet wand of claim 11, wherein:

a longitudinal length of at least one of the first cavity and the second cavity is greater than its transverse length; and a longitudinal length of the plate is greater than its transverse length.

18. The faucet wand of claim 11, wherein:

a cross-sectional shape of at least one of the first cavity and the second cavity is non-linear along its longitudinal length; and a shape of the plate is non-linear along its longitudinal length.

19. The faucet wand of claim 18, wherein:

the cross-sectional shape of at least one of the first cavity and the second cavity forms an obtuse angle along its longitudinal length; and the shape of the plate forms an obtuse angle along its longitudinal length.

20. The faucet wand of claim 19, wherein:

the cross-sectional shape of at least one of the first cavity and the second cavity forms a plurality of obtuse angles along its longitudinal length; and the shape of the plate forms a plurality of obtuse angles along its longitudinal length.

21. A faucet wand, comprising:

a waterway through which water can flow, the waterway including:

a body having a first cavity and a second cavity provided downstream of the first cavity, an inlet passage upstream of the first cavity, the first cavity and the second cavity extend along a longitudinal direction of the body; and a solid plate operable to be attached to the body, in a fluid tight manner, the attachment of the plate to the body encloses the first cavity and the second cavity and forms a first conduit and a second conduit in the waterway;

wherein, when the plate is attached to the body, in a fluid tight manner, water can flow through the first conduit and the second conduit along a path that is generally parallel to a plane of the plate;

a valve disposed between the first conduit and the second conduit, wherein the valve controls the fluid communication between the first conduit and the second conduit;

a spray face downstream of the first and second cavities and connected to the body at one longitudinal end, wherein the spray face extends along a different plane than a central longitudinal plane of the body where the connection of the spray face to the body is made; and a shell with a portion of the body with the first and second cavities, the plate, and a portion of the spray face within the shell.

22. A faucet wand, comprising:

a waterway through which water can flow, the waterway including:

a body having a first side, the first side having a first cavity provided therein, the first side and the first cavity extend along a longitudinal direction of the body;

the body including an inlet passage upstream of the first and second cavities;

a first solid plate operable to be attached to the first side of the body, in a fluid tight manner, the attachment of the first plate to the first side of the body encloses the first cavity and forms a first conduit in the waterway;

wherein, when the first plate is attached to the first side of the body, in a fluid tight manner, water can flow through the first conduit along a path that is generally parallel to a plane of the first plate;

the body having a second side, the second side having a second cavity provided therein, the second side and the second cavity extend along the longitudinal direction of the body; and a second solid plate operable to be attached to the second side of the body, in a fluid tight manner, the attachment of the second plate to the second side of the body encloses the second cavity and forms a second conduit in the waterway;

wherein, when the second plate is attached to the second side of the body, in a fluid tight manner, water can flow through the second conduit along a path that is generally parallel to a plane of the second plate;

a spray face downstream and connected to the body at one longitudinal end, wherein the spray face extends along a different plane than a central longitudinal plane of the body where the connection of the spray face to the body is made; and a shell with a portion of the body, and the plate within the shell.

* * * * *